United States Patent [19]

Keller et al.

[11] Patent Number: 5,725,793
[45] Date of Patent: Mar. 10, 1998

[54] AGENTS FOR ABSORPTION MACHINES

[75] Inventors: Jürgen Keller; Ralf Peters, both of Siegen, Germany

[73] Assignee: Universität Siegan, Siegan, Germany

[21] Appl. No.: 464,656

[22] PCT Filed: Dec. 17, 1993

[86] PCT No.: PCT/DE93/01218

§ 371 Date: Jun. 15, 1995

§ 102(e) Date: Jun. 15, 1995

[87] PCT Pub. No.: WO94/13752

PCT Pub. Date: Jun. 23, 1994

[30] Foreign Application Priority Data

Dec. 17, 1992 [DE] Germany .................. 42 42 602.2

[51] Int. Cl.$^6$ .................. C10M 173/02; C09K 5/02; C09K 5/04

[52] U.S. Cl. .................. 252/69; 252/73; 252/77

[58] Field of Search .................. 252/67, 69, 73, 252/77

[56] References Cited

U.S. PATENT DOCUMENTS

| | | | |
|---|---|---|---|
| 4,614,605 | 9/1986 | Erickson | 252/69 |
| 5,186,009 | 2/1993 | Rockenfeller | 252/69 |

*Primary Examiner*—Paul Lieberman
*Assistant Examiner*—Mark Kopec
*Attorney, Agent, or Firm*—Antonelli, Terry, Stout, & Kraus, LLP

[57] ABSTRACT

The present invention proposes adding an alkaline solution or a mixture of two or more alkaline solutions to the agent system of absorption machines operating with ammonia or methylamine as the agent and water as the solvent. This addition of an alkaline solution or an alkaline solution mixture has a number of advantageous effects. These are, i.a.

1. The dissolving respectively expelling heat of the agent is reduced, raising the output figure.
2. The agent vapor generated is very pure. A dephlegmator is obviated.
3. The alkaline solution makes steel surfaces inert when sealed from air and in a high vaccum, thereby obviating corrosion inhibitors.
4. The viscosity of the solvent is reduced, decreasing pump operation.

8 Claims, 5 Drawing Sheets

AGENTS FOR ABSORPTION MACHINES

DESCRIPTION

1. Technical Field

The present invention relates to agents for absorption machines according to the introductory part of claim 1.

In particular, agents respectively agents systems can be utilized in absorption machines such as absorption heat pumps, absorption refrigerating machines, absorption heat transformers and absorption compression heat pumps and absorption compression refrigerating machines.

2. State of the Art

With the regard to the state of the art, reference is made to the following literature:

Altenkirch, E.: Absorptionskältemaschinen, VEB-Verlag Technik, Berlin, 1954,

DE-PS 607 059 (Altenkirch, E.), Kontinulierlich wirkende Absorptionskältemachine.

Niebergall, W., Sorptionskältemaschinen, Handbuch der Kältetechnik, R. Plank, Hsg., Bd. 7, Springer, Berlin, etc., 1959.

Richter, K. -H., Entscheidungshilfen für die Planung von Absorptions-Kälteanlagen, Verfahrenstechnik 6 (1972), 390–399.

Ziegler, B., Wärmetransformation durch einstufige Sorptionsprozesse mit dem Stoffpaar Ammoniak-Wasser, Dissertation, ETH Nr. 7070, Zürich, 1982.

Bokelmann, H., Industrielle Anwendung der Absorptions-wärmepumpe, Brennstoff-Wärme-Kraft, 40 (1988), 250–55.

Stephan, K., Der Wärmetransformator—Grundlagen und Anwendungen, Chem.-Ing.-Techn., 60 (1988), 335–48.

Plöcker, U. et al., Wärmetransformatoren für die Chemische Industrie aus der Sicht des Anwenders, Chem.-Ing.-Tech., 60 (1988), 103–8.

Reference is explicitly made to this state of the art with regard to all terms not made more apparent herein.

Absorption machines are very environmental friendly, but relatively complicated and expensive machines for producing effective heat and refrigeration. The high investment costs, the control difficulties, the unfavorable partial load behavior and the relatively low thermal output figures, which are, in the case of heat pumps, usually little above 1, have hitherto stood in the way of more widespread use. This, however, is not true for small refrigerating aggregates for home, hotel and leisure time use, such as for cold water sets and air-conditioning devices used in countries such as the USA and Japan.

As the output figures, i.e., the ratio of effective heat respectively refrigeration to the applied heat, decisively depends on the choice of a "suited" pair of agents, work began early on new relatively optimum pairs of agents. In the field of refrigerating machines and low-temperature heat pumps, the agent pair ammonia ($NH_3$) as the refrigerant with water ($H_2O$) as the solvent has proven itself in small plants as well as in large plants up to a power of several megawatts. Certain drawbacks of this pair of agents are that certain of parts water evaporate along with the ammonia when expelling the ammonia in the generator of a machine.

Since as pure as possible agents are required for obtaining low temperatures, it is necessary to provide a agent vapor purifier (dephlegmator) in the plant. This naturally raises the investment costs as well as the operation costs respectively lowers the output figures of the overall process.

Moreover, the high vapor pressure of ammonia has an unfavorable effect on dimensioning the heat exchangers and pipe lines and on the heat transition figures. In addition, aqueous ammonia solutions are corrosive, in particular, at high temperatures, i.e. require the use of corrosion inhibitors, such as, e.g., chromic salt ($Na_2Cro_4$).

Various authors have proposed raising the output figures of absorption machines employing the technically proven agent system ammonia ($NH_3$)-water ($H_2$) by adding various types of salt.

With regard to this, reference is made to EP-A-0 012 856 as well as the literature mentioned in DE-PS 28 55 434 of the same priority or to A. Zimmermann, Experimentelle Untersuchung der Dampf-Flüssigkeit-Phasengleichgewichte im Stoffsystem $NH_3$—$H_2O$—LiBr, dissertation, University of Siegen, GH, 1991.

The addition of salts to the solvent water, however, presents problems. Often the so-called solution range of ammonia is greatly reduced in the pressure-temperature-diagram, i.e., there is a danger that solid phases, e.g. ammonia salt compounds precipitate during the absorption process in the solution and cause serious disturbances.

Such results were published by R. Peters, R. Busse, J. U. Keller in "Solid-Liquid Equilibria in the Systems $NH_3$—$H_2O$—LiBr and $H_2O$—LiBr at p=1 atm in the Range from $-35°$ to $80°$ C.", (Journal of Thermophysics, Vol. 14, No. 4, 1993).

Furthermore, it was discovered that, e.g., although the large addition of LiBr to $NH_3$—$H_2O$ solutions reduces the water content during the vapor phase, at the same time it, however, also lowers the partial pressure of ammonia. The addition of salt not only retains water in the liquid phase, but also retains ammonia!

Moreover, aqueous solutions of salts are generally very corrosive. Various corrosion inhibitors available today do not always have satisfactory effects and, in addition, present a disposal problem.

DESCRIPTION OF THE INVENTION

The object of the present invention is to further develop the agent systems ammonia ($NH_3$)-water ($H_2O$) and methylamine-water by adding one or several agents to the solvent water ($H_2O$) in such a manner that the new agent systems yield higher output figures in the absorption machines, i.e. in saving energy and in reducing the problem of corrosion.

An invented solution to this object is set forth in claim 1. Further embodiments of the present invention are the subject-matter of the dependent claims.

The present invention is based on the fundamental idea of adding a relatively small amount of a alkaline solution or a special mixture of alkaline solutions to the solvent water in the agent system ammonia-water or methylamine-water according to claim 1.

The addition of alkaline solutions has a number of striking advantages the sum of which leads to a considerable increase in the output figure of the ammonia and water respectively methylamine and water operated absorption machines.

The addition of alkaline solutions has among other things the following advantages, which are made more apparent in the following with reference to the accompanying drawings.

BRIEF DESCRIPTION OF THE DRAWING

The present invention is described by way of example in the following without the intention of limiting the scope or spirit of the overall inventive idea using preferred embodiments with reference to the drawings, to which explicitly is referred for the disclosure of all invented details not explained more closely herein.

DESCRIPTION OF PREFERRED EMBODIMENTS

In the following, the advantages obtained with the invented addition of a alkaline solution respectively a mixture of alkaline solutions are explained by way of example:

1. Reduction of the water content in the vapor phase above a fluid phase composed of ammonia, water and alkaline solution:

Therefore, a very pure agent is at disposal in the condenser respectively evaporator of an absorption refrigerating machine. In this manner, lower evaporating temperatures can be attained than with aqueous ammonia. Moreover, the dephlegmator, i.e. the agent vapor purifier is obviated in conventionally built plants.

Figure 1:
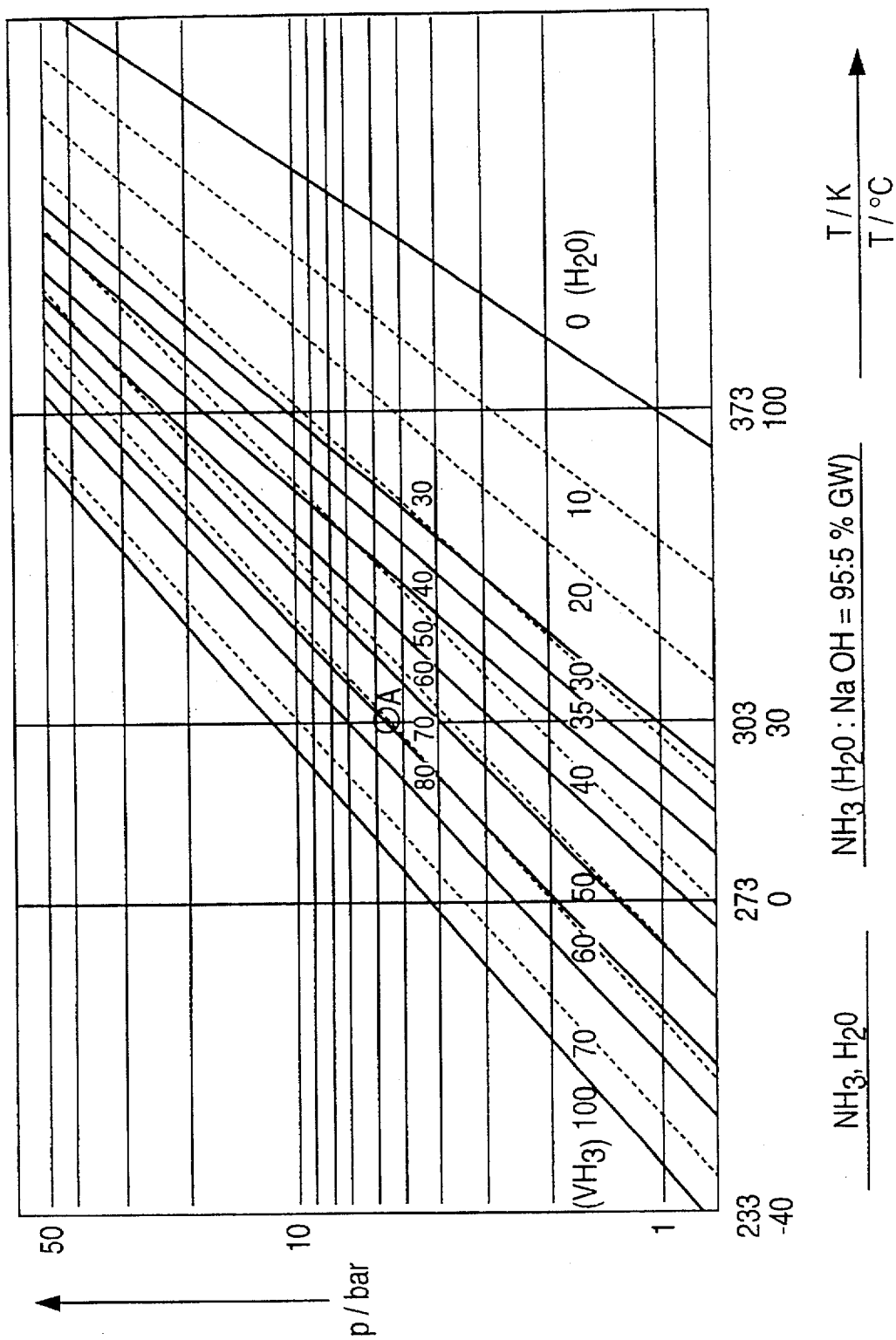
FIG. 1 shows a pressure-temperature-diagram for the system ($NH_3$—$H_2O$, NaOH).

2. In the liquid phase, with a given pressure and temperature, there is an increased concentration of ammonia in the mixture containing the alkaline solution compared to the pure ammonia-water mixture:

This is made more apparent in FIG. 1, which shows, by way of example, a pressure-temperature diagram for the system ($NH_3$—$H_2O$, NaOH) in the case of a mass concentration of $H_2O$:NaOH=95:5 wt. % in relation to pure water. The vapor pressure curve for the agent pair $NH_3$—$H_2O$ is depicted by broken lines. The respective mass concentrations of ammonia in per cent (%) are plotted in the first column of numbers starting from the temperature axis. The right relatively steep line corresponds to the vapor pressure curve of water, the outer left line, which is distinctly flatter, represents the vapor pressure curve of pure ammonia. The unbroken lines between these two vapor pressure curves represent the vapor pressure curves for the three agent system ($NH_3$—$H_2$=, NaOH).

It is recognized that, e.g., in the status point (A) at 30° C. at about 5.6 bar, that the solution with alkaline solution already contains 70 wt. % of ammonia, whereas only 60 wt. % of ammonia is present in a solution without alkaline solution. This concentration of the agent in the solvent results in a better relationship of the agent mass flow to the solvent mass flow and thereby in an increase in specfic, i.e., thermal output with reference to the solvent mass flow.

If the ammonia content is small, the vapor pressure curves of ammonia in water and of ammonia in a very diluted caustic soda solution differ very little. In this concentration range, there may even be a certain decrease in $NH_3$ in the alkaline solution compared to in pure water.

3. The heat of solution of ammonia in very diluted aqueous alkaline solutions is distinctly less than in pure water.

This reduces the amount of heat required to expell the agent ammonia from a strong ammonia solution and therefore raises the output figures of the absorption process.

4. The alkaline solution makes the surfaces of containers and pipe lines made of steel, such as, e.g., Stl.4401, St1239, etc., inert.

This obviates a corrosion inhibitor in mean-term and long-term operation.

5. The surface of steel containers and pipe lines is covered with a coating.

This distinctly reduces the flow resistance of the solvents in the pipelines, i.e. reduces the pump output required for transferring by pumping.

Claim 3 describes advantageous concentrations for various alkaline solutions respectively mixtures named by way of example. Greater deviations from the ranges mentioned in claim 3 and, in particular, the addition of larger amounts of alkaline solutions do not result in further improvement, but rather, quite the contrary, usually cause technical difficulties.

In these solutions, not only one but several fluid phases of varying concentration and furthermore solid phases with a flakelike, needlelike or platelike structure may form even at mean pressures and temperatures, which can be the source of serious disturbances in operation.

The aforementioned advantages cannot only be utilized in classical absorption machines (heat pumps, refrigerating machines, heat trsndformers), but also in their further improvements, notably multistep machines, compression-absorption machines and machines having vortex tube expansion elements of all performance classes, i.e., devices for the home, commerce and industry.

The favorable effect of adding alkaline solutions to the agent system ammonia-water are made more apparent in the following using protocols of comparison measurements. The measurements were conducted with identical commercial absorption refrigerating devices working according to the Platen & Munters process, i.e., without mechanical fluid pumps.

A device, standard refrigerator No. 4, is operated using the agent system ammonia-water (plus corrosion inhibitor). The second device, test refrigerator No. 6/1b, operates using the system ammonia-water-caustic soda solution as the agent.

In both devices, hydrogen is utilized as the inert gas.

Figure 2:
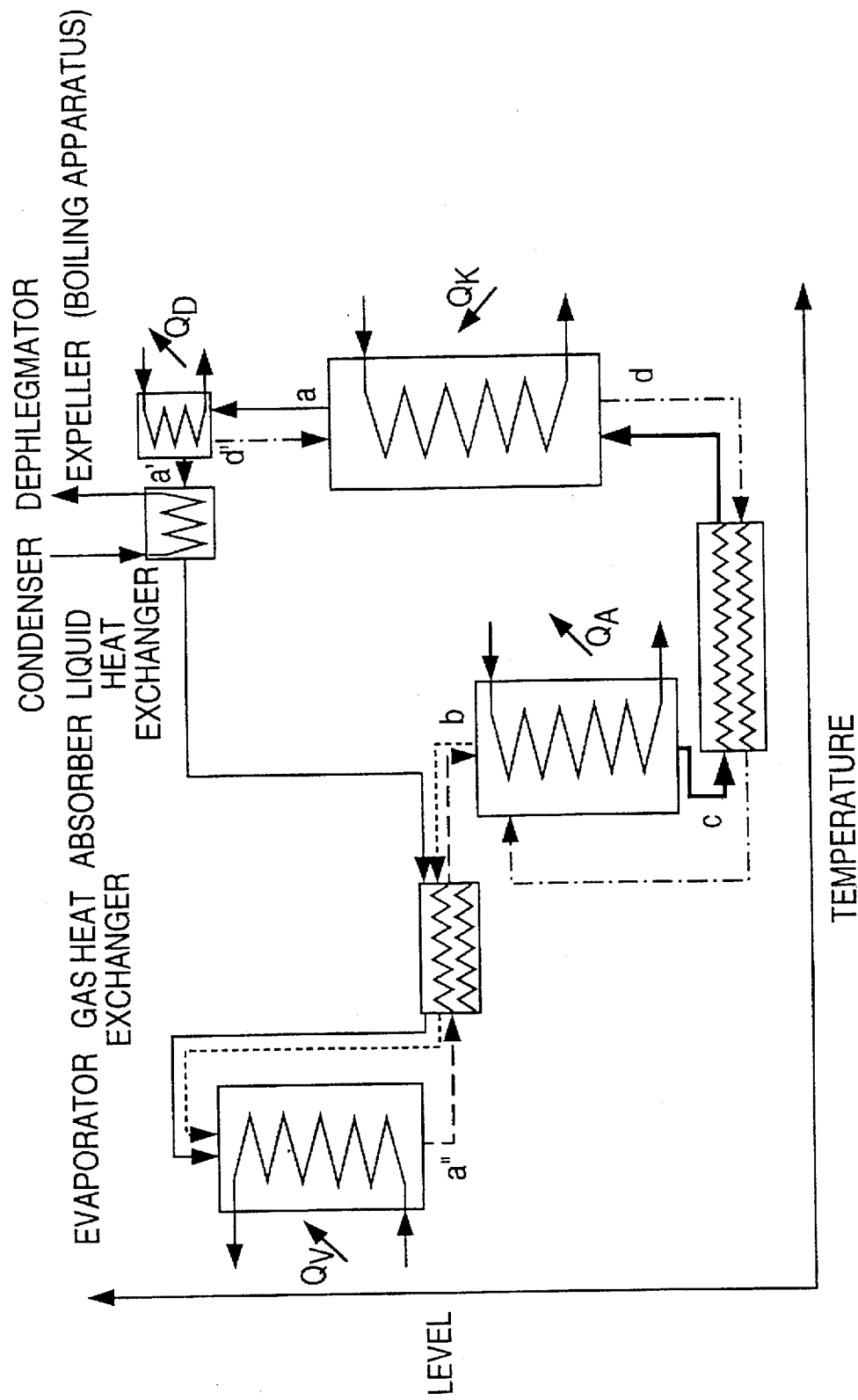
FIG. 2 shows a block diagram of an absorption machine, in which the invented agents can be utilized.

FIG. 2 shows in a block diagram, which is plotted in a height/temperature diagram, the principle manner of functioning of the aforementioned devices:

Herein are:

| | |
|---|---|
| a | the agent and solvent vapor, |
| a' | the agent vapor, |
| a" | the agent vapor with an auxilliary gas, |
| b | the auxilliary gas, |
| c | strong solution, |
| d | weak solution, |
| d' | partially condensed weak solution |

The bold lines represent the solvent cycle, whereas the thin lines represent the agent cycle with the auxilliary gas.

The expeller (boiling apparatus) evaporates ammonia and some water from the strong ammonia solution. The water is condensed in a dephlegmator, which is disposed thereabove, by cooling the vapor and flows back into the boiling apparatus. The purified ammonia vapor condenses in the subsequent condenser and is cooled in the gas-heat exchanger. The cooled, liquid ammonia flows into an evaporator filled with an inert gas, evaporates there at little partial pressure, i.e., low temperatures and flows thereupon as a cold ammonia-inert gas mixture in reverse flow through the gas heat exchanger. The heat required to evaporate the liquid ammonia is drawn from the surroundings of the evaporator, that is, e.g., the goods to be cooled. The ammonia gas contacts the weak ammonia solvent in the absorber, is absorbed, preheated in a reverse flow heat exchanger and conveyed back to the expeller as a strong ammonia solution.

Figure 3:
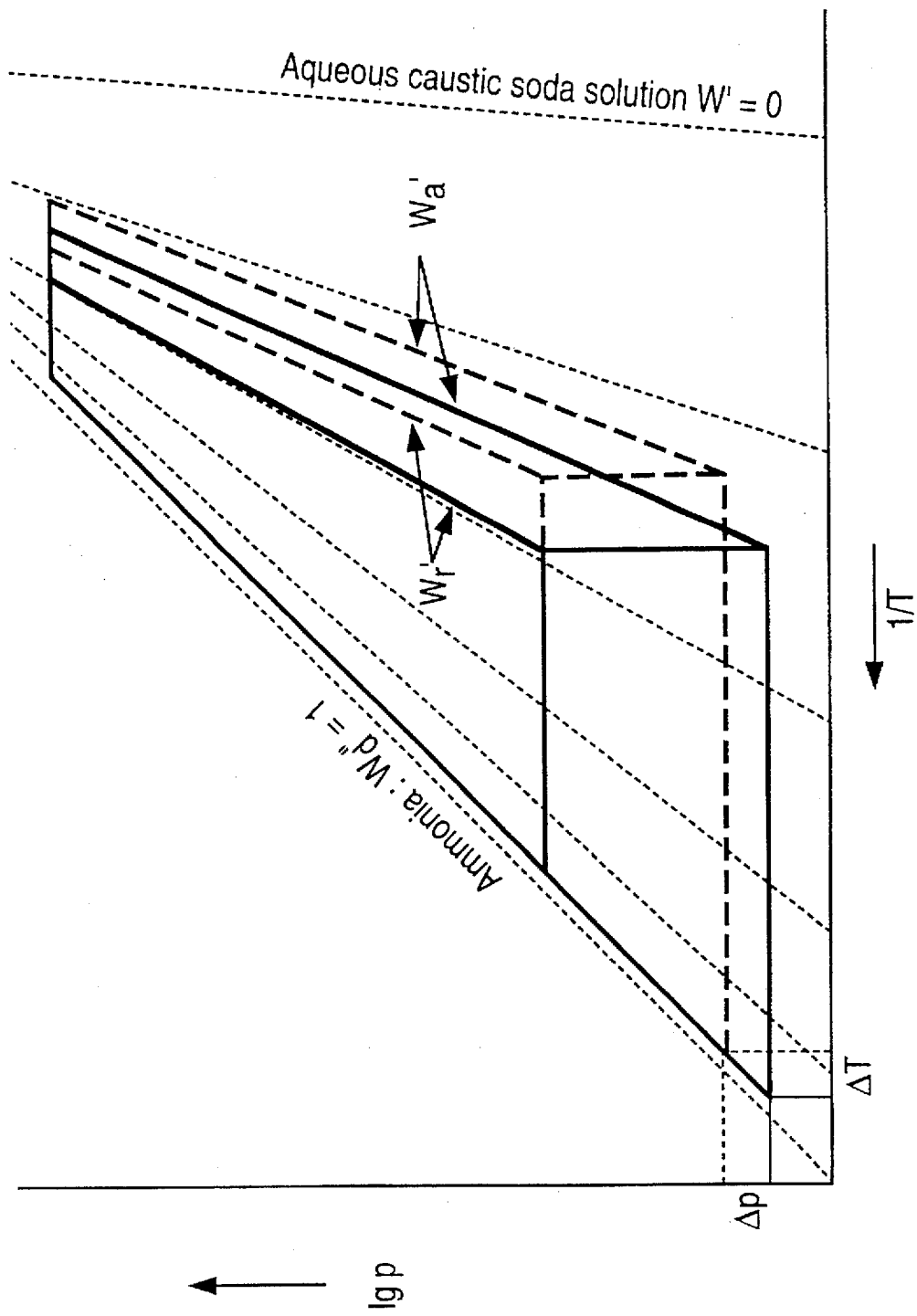
FIG. 3 shows the cyclical process executed by the machine depicted in FIG. 2 schematically in a pressure-temperature diagram.

FIG. 3 shows schematically, in a pressure (1n p)-temperature (1/T) diagram, the cyclical process carried out by the machine depicted in FIG. 2. It also indicates the qualitative effect of the alkaline solution addition. The broken lines relate to the process of the ammonia-water system. The unbroken lines correspond to the ammonia-water-alkaline solution system. By adding an alkaline solution, the absorption and desorption process can be moved to somewhat higher concentrations of ammonia. In this manner, the lowest evaporation temperature attainable when the liquid ammonia enters the evaporator can be lowered accordingly.

Figure 4:
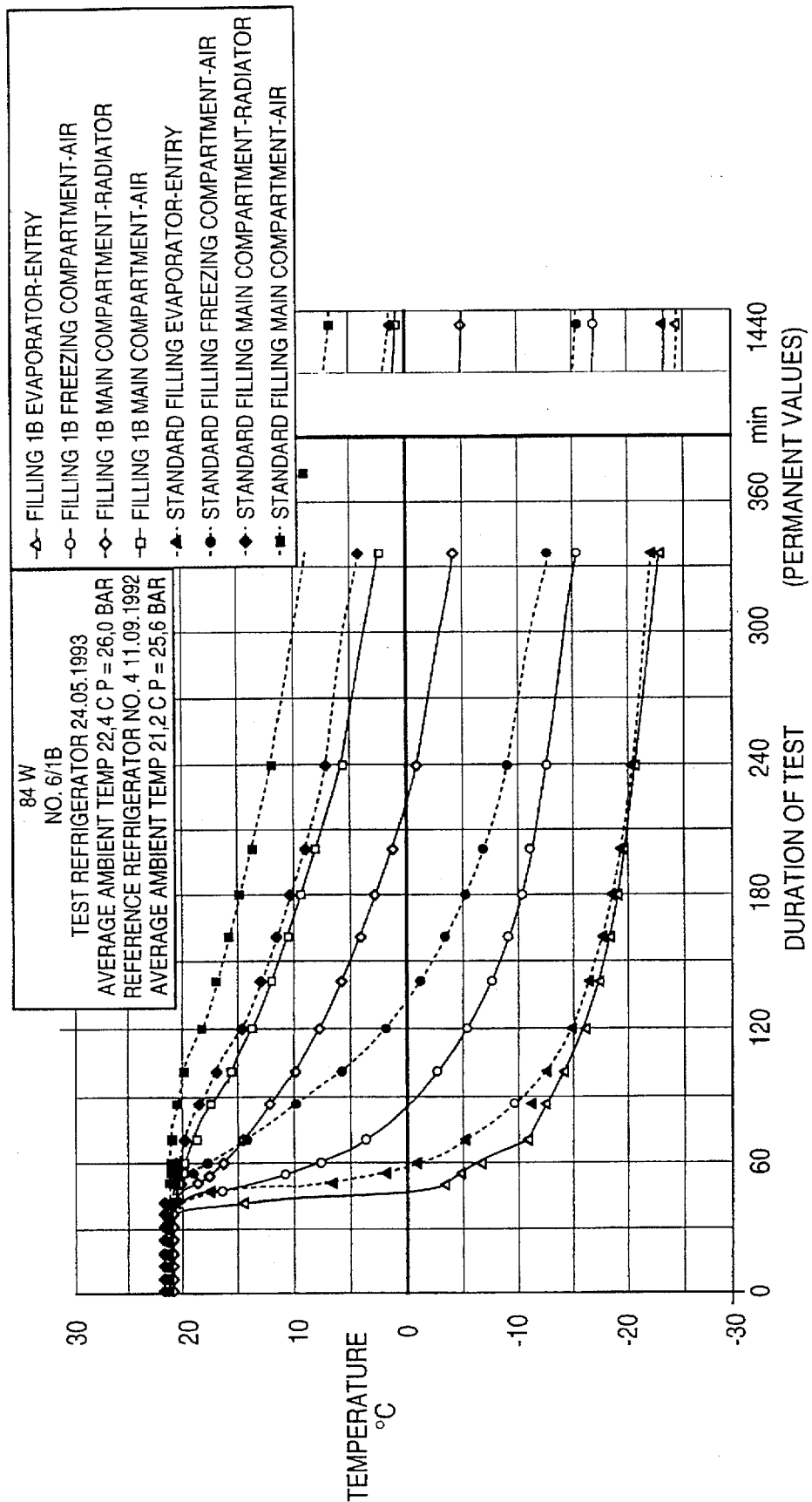
FIG. 4 shows a test protocol for a refrigerating device operated using a conventional agent system and for a refrigerating device using an invented agent system.

FIG. 4 shows a measurement protocol depicting the cooling process in the two aforedescribed refrigerators from an ambient temperature of T≦21.8° C. to an operation temperature.

Shown are the courses of the air temperatures in the main compartments and in the deep-freeze or freezing compartments of the two refrigerators. Moreover, the temperature courses at the entry points of the refrigerant into the evaporator and at the main compartment radiators.

The dotted lines are characteristic of the temperatures in the device using the ammonia-water agent.

The unbroken lines describe the corresponding temperatures in the device using ammonia-water-alkaline solution as the agent system.

The power input was the same in both devices and constant during the duration of the test (84 W, electric).

It is apparent that the system containing an alkaline solution cools quicker than a standard system (No.4). This may result, in particular in interval operation, in considerable energy savings. Moreover, the air temperature in the main compartment and freezing compartment pertinent for operation in practice is approximately 5° C. respectively 1.5° C. lower in the system operating with an alkaline solution than in the standard system having the same power input!

This corresponds with the same cooling temperatures to reducing the power requirements of the system operating with an alkaline solution by approximately 18%.

Figure 5:
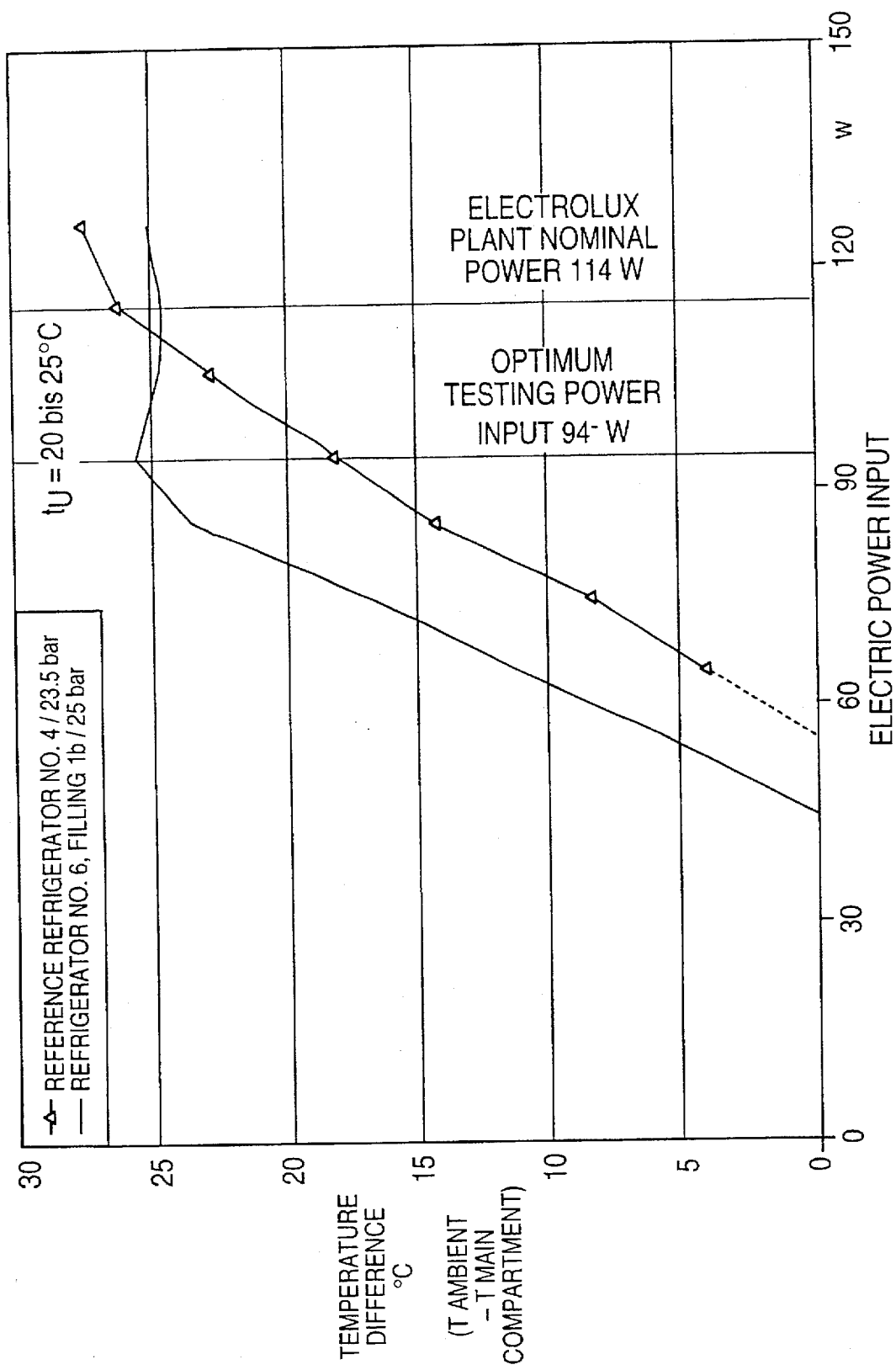
FIG. 5 shows a representation indicating the advantages obtained using the present invention.

FIG. 5 shows the differences attained in temperature between the ambient temperature and that of the main compartment in the two refrigeration devices under stationary operation conditions dependent on the power input (electric).

The refrigerating device 6/1b with alkaline solution already starts operating at approximately 45 W power input and attains maximum cooling of approximately 25° C. compared to the ambient temperature (approximately 22° C.) at a power input of 94 W.

The alkaline solution-free reference device starts operating from approximately 60 W and requires a power of 114 W, i.e. about 21% more than the (not optimized) test device using the solvent containing alkaline solution in order to attain the same refrigeration.

In order to assess these results, it is necessary to consider all the usual criteria equally. These are, in addition to the cost of thermal energy and the gained refrigerating output respectively the assigned refrigerating output figure, certainly also the partial load behavior respectively the ability to control, the cost of the apparatus, requirements of the agent (corrosion) and the environmental compatability respectively disposal aspects of a device.

Taking these aspects into consideration, the invented agent is distinctly superior to conventional agents although there are still numerous possible ways of improving the described test device. Moreover, in order to achieve optimum operation, numerous individual factors, that have to be tuned to each other, need to be regarded.

Among them are, in addition to the purely thermodynamic properties of the utilized agent system, also its transport properties (viscosity, thermal conductivity, diffusion coefficients), the utilized amounts of agent, solvent and inert gas, the ambient temperature, the geometric arrangement of the individual apparatuses (evaporator, condenser, etc.) in the earth's gravity, their size and shape and the selection of the materials employed.

The invented alkaline solution-containing agent can be used in hitherto ammonia-water operated absorption devices and machines immediately without changing the plants, resulting in all instances in the following advantages:

1) obviation of the dephlegmator
2) reduction of the expeller heat
3) obviation of a corrosion inhibitor, such as, e.g., chromic salt.

However, for optimum exploitation of these effects, a new design of the plant is advantageous, taking into consideration all the mentioned individual facts and criteria.

What is claimed is:

1. In an absorption agent system for absorption apparatus which absorption agent system comprises an aqueous solution containing ammonia or a methylamine as an absorption agent or refrigerant and water as a solvent, the improvement wherein said solution further contains at least one alkali metal compound selected from the group consisting of NaOH, KOH, LiOH.$H_2O$ and CsOH.$H_2O$ in a concentration of from 2 to 10% by weight of the total weight of the at least one alkali metal compound and water.

2. The absorption agent system according to claim 1, wherein the concentration of the at least one alkali metal compound decreases within the aqueous solution with decreasing operating temperatures of the solution within the absorption apparatus.

3. The absorption agent system according to claim 1, wherein a gas phase of ammonia or methylamine generated from said agent contains less than 1% by weight of water and less than 0.01% by weight of the alkaline solution.

4. In a process for operating an absorption apparatus, wherein the improvement comprises incorporating the absorption agent system of claim 1 in said apparatus as a working fluid, and said apparatus has air-tight containers, pipelines and fixtures made of steel with incorporating in the apparatus a corrosion inhibitor.

5. In a process for operating an absorption apparatus, wherein the improvement comprises incorporating the absorption agent system of claim 1 in said apparatus as a working fluid, and the absorption apparatus comprises one of absorption heat pumps, absorption heat transformers and absorption refrigeration machines.

6. In a process for operating an absorption apparatus, wherein the improvement comprises incorporating the absorption agent system of claim 1 in said apparatus as a working fluid, and the absorption apparatus has vortex tube expansion elements.

7. In a process for operating an absorption apparatus, wherein the improvement comprises incorporating the absorption agent system of claim 1 in said apparatus as a working fluid, and the absorption apparatus does not include means for cleaning vapor generated from said agent.

8. A working fluid for an absorption cycle apparatus, which working fluid comprises an aqueous solution containing ammonia or methylamine as an absorption agent or refrigerant and water as a solvent, said solution further containing at least one alkali metal compound selected from the group consisting of NaOH, KOH, LiOH.$H_2$O and CsOH.$H_2$O in a concentration of from 2 to 10% by weight of the total weight of the at least one alkali metal compound and water.

* * * * *